Aug. 7, 1956     K. A. KLINGLER     2,757,688
TWO-WAY VALVE
Filed Aug. 4, 1953             4 Sheets-Sheet 1
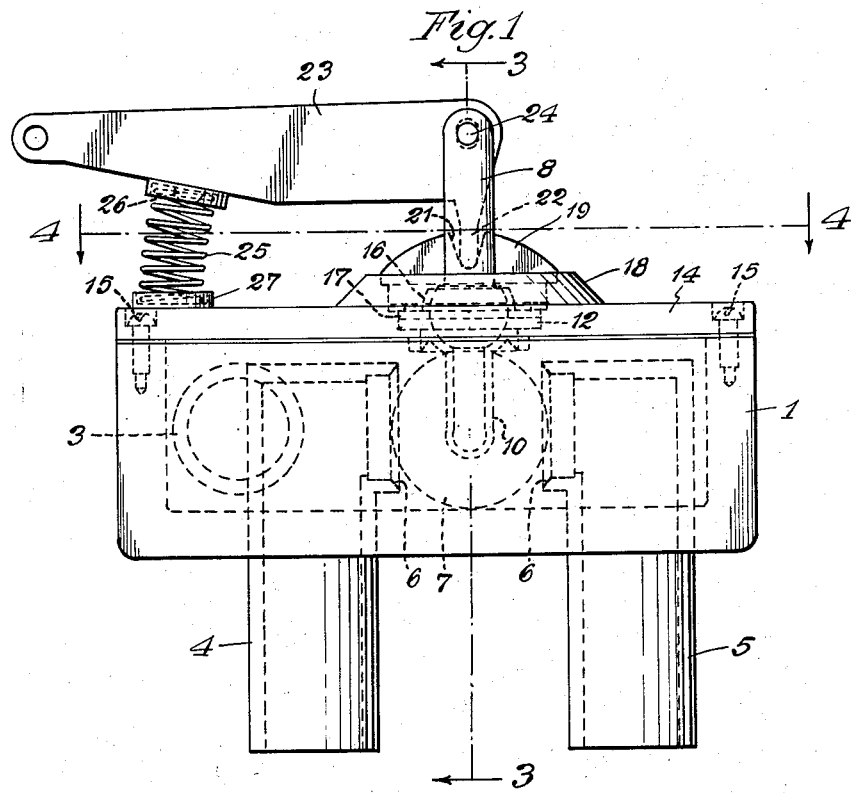
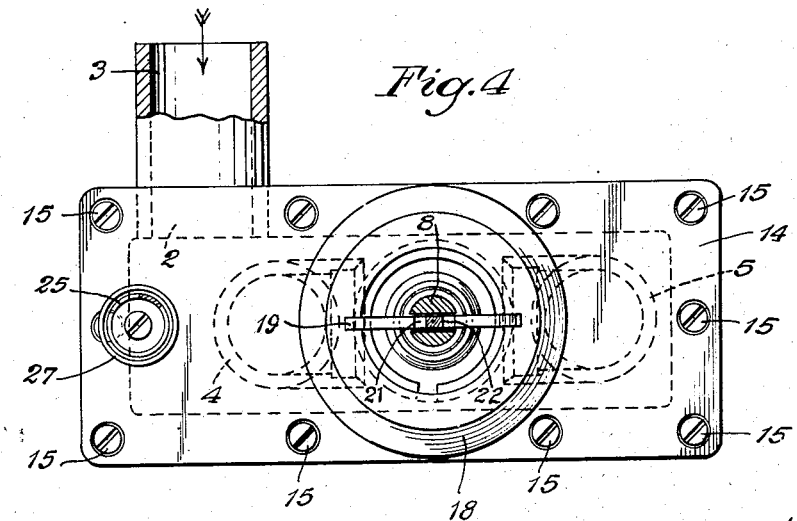
Inventor
Karl A. Klingler
by Parker & Carter
Attorneys Aug. 7, 1956 K. A. KLINGLER 2,757,688
TWO-WAY VALVE
Filed Aug. 4, 1953 4 Sheets-Sheet 2
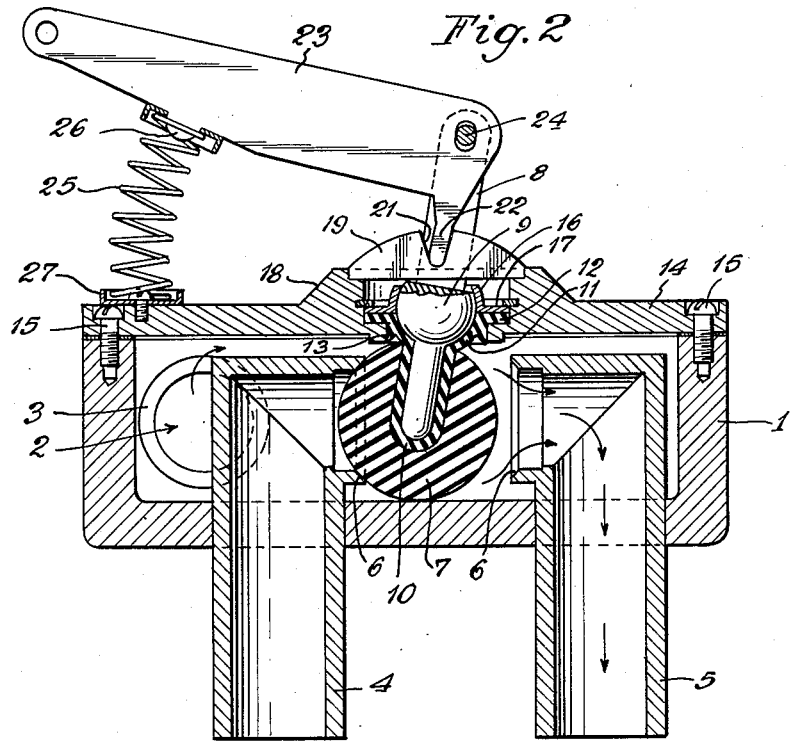
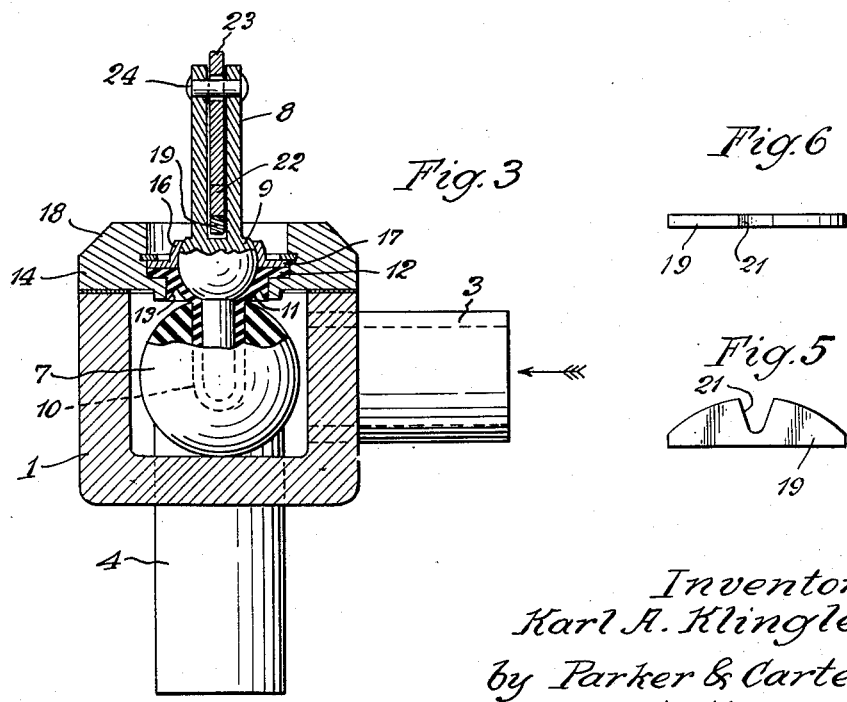
Inventor
Karl A. Klingler
by Parker & Carter
Attorneys Aug. 7, 1956  K. A. KLINGLER  2,757,688
TWO-WAY VALVE
Filed Aug. 4, 1953  4 Sheets-Sheet 3
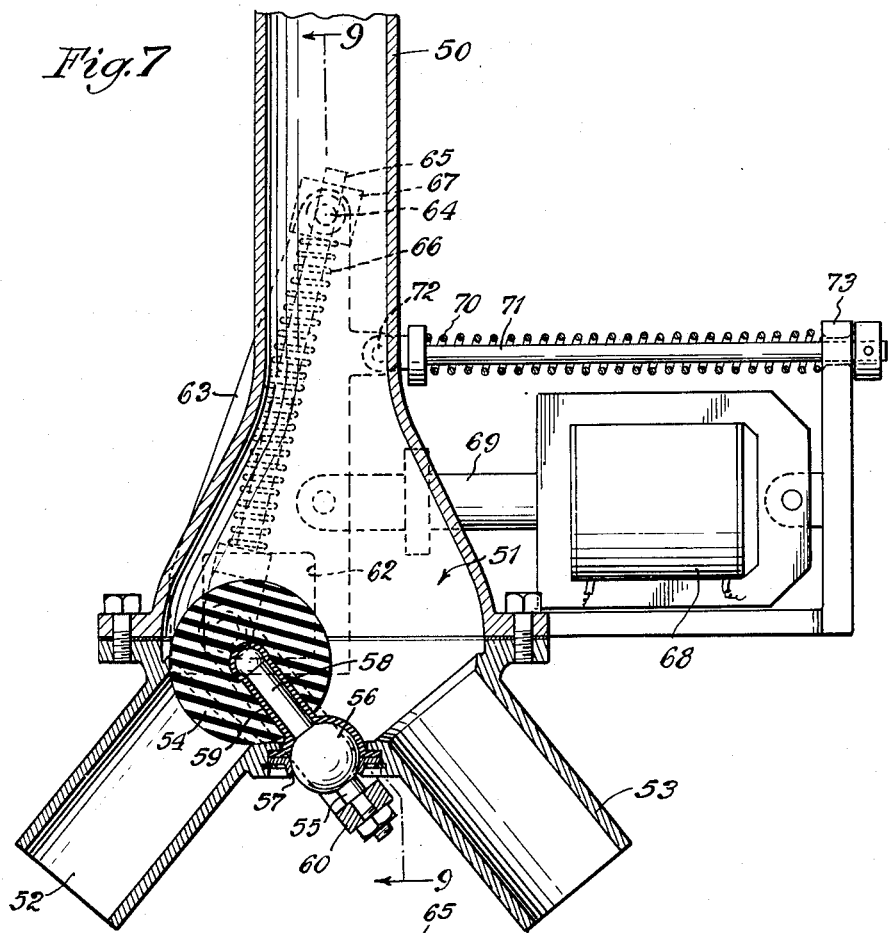
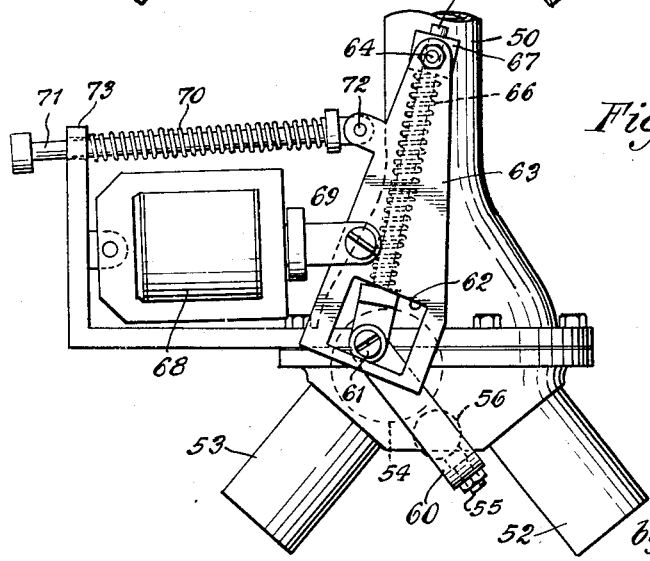
Inventor
Karl A. Klingler
by Parker & Carter
Attorneys

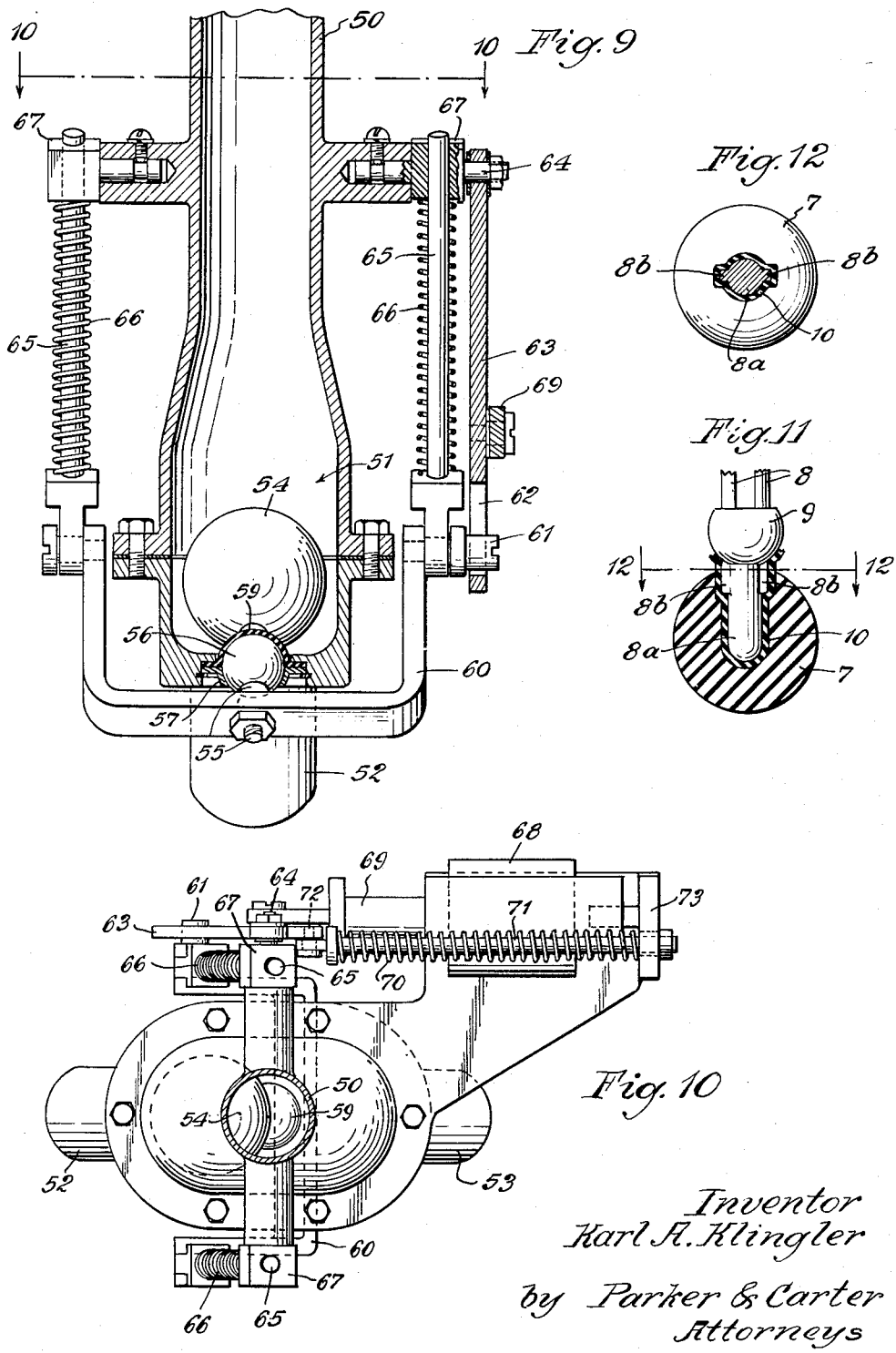

United States Patent Office 2,757,688
Patented Aug. 7, 1956

2,757,688

TWO-WAY VALVE

Karl A. Klingler, Naperville, Ill.

Application August 4, 1953, Serial No. 372,246

12 Claims. (Cl. 137—625.44)

My invention relates to improvements in two-way ball valves and has for one object to provide a two-way ball valve which is easily and cheaply manufactured, easily assembled and maintained and which will not leak around the control mechanism.

Another object of my invention is to provide such a valve wherein the parts though easily and quickly assembled and disassembled provide positive means for preventing leakage around the actuating connections.

Another object is to provide a valve which will effectively seal under pressure, can be easily unseated and is positive in action.

Other objects will appear from time to time throughout the specification and claims.

My invention is illustrated more or less diagrammatically in the accompanying drawings, wherein—

Figure 1 is a side elevation of the valve in neutral position;

Figure 2 is a longitudinal section through the valve with one outlet closed, the other open;

Figure 3 is a section along the line 3—3 of Figure 1;

Figure 4 is a section along the line 4—4 of Figure 1;

Figure 5 is a side view of the supporting bridge;

Figure 6 is a plan view of the member shown in Figure 5;

Figure 7 is a vertical section through a modified form of the device;

Figure 8 is a side elevation on a reduced scale with parts in different position from Figure 7;

Figure 9 is a section on the line 9—9 of Figure 7;

Figure 10 is a section on the line 10—10 of Figure 9 on a reduced scale;

Figure 11 is a section through a modified form of finger and ball valve;

Figure 12 is a section on the line 12—12 of Figure 11.

Like parts are indicated by like characters throughout the specification and drawings.

1 is a valve body. It comprises a generally rectangular box having an inlet port 2 communicating with an inlet pipe 3. Two opposed outlet pipes 4 and 5 are provided. They are socketed in the floor of the valve body and each carries a valve seat 6. These two seats are in opposition to one another in concentric alignment and are of the same diameter. I have illustrated for convenience a particular arrangement of these pipes though they might be otherwise arranged so long as the two valve seats 6 are in opposition and communicate with the interior of the chamber which receives flow through the port 2.

7 is a ball of rubber or rubber-like material contained between the two opposed seats 6. 8 is a valve actuating finger. At one end it penetrates the ball seal or valve 7. At the other end, it extends beyond the housing or valve body 1. Intermediate its ends it is provided with a spherical ball bearing 9. 10 is a flexible sealing sleeve or tubular pouch member which is closed at one end on and encloses the valve ball penetrating end of the valve actuating finger. The sleeve has a truncated spherical portion 11 extending from the finger upwardly around the bearing ball 9. It is flanged at 12. Extending downwardly from the flange at its junction with the truncated spherical portion is a sealing rib 13. 14 is a valve body cover. It is apertured to encircle the finger, is removably screwed to the valve body as at 15 and the aperture snugly fits the sealing rib 13. The flanged portion 12 engages the outside of the cover. The segmental spherical ring 16 which engages the ball 9 is flanged at 17 to engage the upper portion of the rubber flange 12. 18 is a boss on the cover 14 apertured concentric with the lower aperture in the cover and of larger diameter and it contains the bridge 19 which overlies the aperture containing the flange 17 on the ball bearing, the flange 17 being held against the sealing ring 12 by any suitable means such as a retaining snap ring let into the wall of the housing.

The bridge 19 is held in slots in the boss 18 and notched at 21 to furnish a bearing for the fulcrum arm 22 extending downwardly from the actuating lever 23, which lever is loosely pivoted to the finger 8 at 24. 25 is a compression spring interposed between the offset 26 on the actuating lever 23 and a pad 27 on the cover.

Referring to Figure 1, it will be noted that the finger 8 is in the neutral position. In Figure 2 the lever 23 has been rotated in clockwise direction about the fulcrum notch 21 and this has rotated the ball valve 7 to the left to close the port 6. If the lever 23 is moved in counterclockwise direction, it will move the ball 7 to the right to close the port 6 on the outlet pipe 5.

The ball 7 cannot slip off the finger 8 because it is limited in its downward movement by the floor of the valve body. Pressure in the valve body tends to force the sleeve against the ball 9 and tends to force the sleeve rib 13 against the wall of the aperture through which the finger extends. Angular movement of the finger stretches and compresses opposed sides of the truncated spherical portion of the sleeve depending on which way the finger is rocked. The fulcrum lever 22 resting in the fulcrum notch 21 limits the finger against inward movement and insures that the ball 9 will at all times engage the truncated spherical ring 16.

The seal provided by the flexible rubber-like sealing sleeve is additionally accomplished by compression of the flange 12 on the sealing sleeve. Whenever the valve is seated on one or other of the outlet seats, pressure within the valve body holds the flexible, compressible rubber-like ball in sealing position. Movement of the finger lifts the ball from its seat into the neutral position and then if further movement continues, into position to close the opposite outlet. Since the pivot center of the ball 9 and the pivot center of the fulcrum arm 22 on the notch 21 are not concentric, the pivot at 24 must be loose to permit relative movement while the end of the fulcrum arm remains in contact with the bottom of the notch 21.

In the modified form shown in Figures 7 to 10, 50 is an intake pipe communicating with a valve chamber 51 from which lead exhaust pipes 52, 53. These pipes in this case are generally at right angles to one another. 54 is a valve ball similar to the ball 7 of Figure 1 and this ball may be thrown back and forth to open or close selectively passages 52 or 53.

55 is a ball valve actuating stem which includes the ball 56 in a flanged bearing collar 57 and a finger 58 extending into the ball 54 provided with the flexible sheath 59 anchored at its lower end on the collar 57 much as is the flexible sealing 10 of Figure 1 and for the same purpose.

60 is a yoke mounted on the pin 55, carrying a cross head 61 engaged in the large aperture 62 in the solenoid actuated yoke 63. The solenoid actuated yoke is pivoted at 64 on the tube 50 and the guide rod 65 associated with the yoke 63 guides the spring 66, the rod being free to slide through an abutment 67. A similar guide rod 65 is connected to the other end of the cross head 61. With the parts in the position shown in Figure 7, the solenoid 68 connected by the link 69 to the yoke 63 may pull the yoke to the right, in which case the cross head 61 is engaged by the yoke 63 and moved to the right, thus moving the ball from the left hand position of Figure 7, closing the tube 52, to right hand position closing the tube 53. This compresses the spring 70 associated with the guide rod 71 pivoted to the yoke 63 at 72 and slidable in the guide 73. As soon as the solenoid 68 is deenergized, the spring 70 throws the yoke 63 back to the left to return the valve to the position shown in Figure 7. The play between the cross head 61 and the yoke 63 allows the spring 66 to complete the rotation of the yoke 60 as soon as the solenoid or the spring 70 has moved the cross head beyond the central position. This play insures that after the member 61 has moved past the central position under the influence of the solenoid or the spring 70, then the springs 66 will violently complete the motion and insure an impact seating of the valve. It also insures an impact contact between the spring or the solenoid to positively and abruptly unseat the valve, thus making it possible to reduce the size of the solenoid and the compression of the spring and still get a clean, fast unseating and seating of the valve.

In the modified form shown in Figures 11 and 12, the finger extension 8a of the stem 8 is provided with laterally extended integral keys 8b which give the sleeve 10 an irregular contour where it encircles the finger 8a and penetrates the ball 7, the ball 7 being pocketed to conform so that angular movement of the ball 7 about the longitudinal axis of the finger is positively prevented. The need for this is that in manufacturing rubber balls of this type, there is always a flushing at the mold joint and it is never possible to cut that flushing off absolutely spherical so it is important that the ball be prevented from rotating in action because otherwise the flushing might drift around into contact with the valve seat and give a leaky valve.

The reason why the ball 9 is used is that this preferable arrangement permits movement of the finger 8 without binding and is self-adjusting. The same result, could be accomplished by the use of a loosely supported cylindrical bearing member. By "ball" as referred to as 9 of Figure 2 for example, I want it understood that I mean a member which has the same general kind of freedom of movement in all directions that a ball would have.

Attention is called to the fact that the over-running connection, the spring arrangement which insures that the valve is seated independent of the movement of the solenoid or the spring 70 makes it sure that even though the toggle or spring movement is too short, to actually seat the valve, the valve is positively seated no matter what deformation of the valve ball or the valve seat may exist.

I claim:

1. In combination, a valve housing having an apertured wall, a valve actuating finger extending through the aperture in the wall, a bearing ball on the finger intermediate its ends, a spherical bearing in the aperture supporting the bearing ball, a sealing sleeve of flexible extensible rubber-like material, closed at one end, open and flanged at the other, the flange being concentric with and encircling the aperture, means for holding the flanged open end of the sleeve in fluid tight contact with the housing wall about the aperture, the finger penetrating the sleeve toward its closed end, a rubber-like ball valve in the housing, penetrated by the closed end, of the sleeve and by the finger, a pair of opposed valve seats in the housing and means outside the housing for moving the finger to move the ball selectively into contact with one or other of the seats.

2. In combination, a valve housing having an apertured wall, a valve actuating finger extending through the aperture in the wall, means for supporting the finger for angular movement in said aperture, a sealing sleeve of flexible extensible rubber-like material closed at one end, open and flanged at the other, the flange being concentric with and encircling the aperture, means for holding the flanged open end of the sleeve in fluid tight contact with the housing wall, the finger penetrating the sleeve toward its closed end, a rubber-like ball valve in the housing penetrated by the closed end of the sleeve and by the finger, a pair of opposed valve seats in the housing and means outside the housing for moving the finger to move the ball selectively into contact with one or other of the seats.

3. In combination, a valve housing having an apertured wall, a valve actuating finger extending through the aperture in the wall, a bearing ball on the finger intermediate its ends, a spherical bearing in the aperture supporting the bearing ball, a sealing sleeve of flexible extensible rubber-like material, closed at one end, open and flanged at the other, the flange being concentric with and encircling the aperture, means for holding the flanged open end of the sleeve in fluid tight contact with the housing wall about the aperture, the finger penetrating the sleeve toward its closed end, a rubber-like ball valve in the housing, penetrated by the closed end of the sleeve and by the finger, a pair of opposed valve seats in the housing and means outside the housing for moving the finger to move the ball selectively into contact with one or other of the seats, said means including a yoke carried by the finger outside of the housing and yielding toggle means associated with opposite ends of the yoke adapted to hold the yoke, finger and ball in such position that the ball contacts selectively one or the other of the seats.

4. In combination, a valve housing having an apertured wall, a valve actuating finger extending through the aperture in the wall, means for supporting the finger for angular movement in said aperture, a sealing sleeve of flexible extensible rubber-like material closed at one end, open and flanged at the other, the flange being concentric with and encircling the aperture, means for holding the flanged open end of the sleeve in fluid tight contact with the housing wall, the finger penetrating the sleeve toward its closed end, a rubber-like ball valve in the housing penetrated by the closed end of the sleeve and by the finger, a pair of opposed valve seats in the housing and means outside the housing for moving the finger to move the ball selectively into contact with one or other of the seats, said means including a spring toggle adapted selectively to hold the finger in such position that the ball valve is in contact with one or other of the seats.

5. In combination, a valve housing having an apertured wall, a valve actuating finger extending through the aperture in the wall, a bearing ball on the finger intermediate its ends, a spherical bearing in the aperture supporting the bearing ball, a sealing sleeve of flexible extensible rubber-like material, closed at one end, open and flanged at the other, the flange being concentric with and encircling the aperture, means for holding the flanged open end of the sleve in fluid tight contact with the housing wall about the aperture, the finger penetrating the sleeve toward its closed end, a rubber-like ball valve in the housing, penetrated by the closed end of the sleeve and by the finger, a pair of opposed valve seats in the housing and means outside the housing for moving the finger to move the ball selectively into contact with one or other of the seats, said means including a yoke carried by the finger outside of the housing and yielding toggle means associated with opposite ends of the yoke adapted to hold the yoke, finger and ball in such position that the ball contacts selectively one or the other of the seats, the toggle actuating means including a rocking member, an over-running connection between the rocking member and the toggle and a solenoid means adapted to rock the rocking member.

6. In combination, a valve housing having an apertured wall, a valve actuating finger extending through the aperture in the wall, means for supporting the finger for angular movement in said aperture, a sealing sleeve of flexible extensible rubber-like material closed at one end, open and flanged at the other, the flange being concentric with and encircling the aperture, means for holding the flanged open end of the sleeve in fluid tight contact with the housing wall, the finger penetrating the sleeve toward its closed end, a rubber-like ball valve in the housing penetrated by the closed end of the sleeve and by the finger, a pair of opposed valve seats in the housing and means outside the housing for moving the finger to move the ball selectively into contact with one or other of the seats, said means including a spring toggle adapted selectively to hold the finger in such position that the ball valve is in contact with one or other of the seats, the toggle actuating means including a rocking member, an over running connection between the rocking member and the toggle and a solenoid means adapted to rock the rocking member.

7. In combination, a valve housing having an apertured wall, a valve actuating finger extending through the aperture in the wall, a bearing member intermediate the ends of the finger movably supported on the wall, a sealing sleeve of flexible extensible rubber-like material closed at one end, open and flanged at the other, means for holding the flanged open end of the sleeve in fluid-tight contact with the housing wall to close the aperture, the finger penetrating the sleeve toward its closed end, a rubber-like ball valve in the housing, penetrated by the closed end of the sleeve and by the finger, the finger being free to rock through an angular excursion to move the valve toward and from its seat and being also free to rock laterally across the plane of valve opening and closing movement.

8. In combination, a valve housing having an aperture through a wall thereof, a valve actuating finger mounted in said aperture for angular displacement, a flexible rubber-like sleeve closed at one end, open at the other and penetrated by the finger, the open end of the sleeve being flanged intermediate the ends of the finger, an apertured ball valve within the housing penetrated by the finger and by the closed end of the sleeve, a valve seat in said housing, the ball being free to move toward and from the valve seat when the finger is angularly displaced, means for holding the flange in sealing relationship with the housing about the aperture.

9. In combination, a valve actuating finger mounted for angular displacement, a flexible rubber-like sleeve closed at one end and penetrated by the finger, the open end of the sleeve being flanged intermediate the ends of the finger, an apertured ball valve penetrated by the finger and by the closed end of the sleeve, an apertured valve housing, said finger being mounted for angular movement in said housing aperture, a valve seat in said housing, the ball being free to move toward and from the valve seat when the finger is angularly displaced, means for holding the flange in sealing relationship with the housing about the aperture, an auxiliary flexible sealing flange concentric with the flange about the open end of the finger and located between the first-mentioned flange and the ball valve and exposed to and adapted to be seated in sealing position by the pressure in the housing.

10. In combination, a valve housing, an inlet and an outlet, a valve seat between them, a ball valve movable toward and from the seat, the wall of the housing being apertured, a valve actuating finger penetrating the housing through the aperture and means for angularly moving the finger to move the valve toward and from its seat, sealing means for the aperture including a sleeve closed at one end, open at the other and enclosing the end of the finger within the housing, the open end of the sleeve being in sealing contact with the wall of the housing about the aperture, means outside of the sleeve for supporting the finger for angular movement but holding it against longitudinal movement.

11. In combination, an apertured ball valve, an actuating finger penetrating the aperture and upon which the ball is mounted, a sleeve encircling the finger open only at the end thereof furthest removed from the ball, a holding flange encircling and extending laterally from the open end of the sleeve, a sealing flange concentric with the holding flange terminating in a feather edge subject to expansion by hydrostatic pressure.

12. For use in a valve housing having a seat, a compressible rubber-like ball valve, an actuating finger penetrating the ball valve, a flexible rubber-like sleeve closed at one end and open at the other, a flange encircling the open end of the sleeve, the sleeve enclosing the finger where it penetrates the ball, a self-sealing lip encircling the open end of the sleeve and interposed between the flange and the ball, the finger including a bearing member closing the open end of the sleeve, a plane defined by the upper face of the flange intersecting the bearing member on the sleeve.

References Cited in the file of this patent

UNITED STATES PATENTS

| | | |
|---|---|---|
| 2,173,529 | Beecher | Sept. 19, 1934 |
| 2,188,216 | Beecher | Jan. 23, 1940 |
| 2,204,885 | Chamberlin | June 18, 1940 |
| 2,313,128 | Densten | Mar. 9, 1943 |